March 27, 1928.　　　　　　　　　　　　　　　　　1,663,720
J. H. MOTT
ENSILAGE CUTTER
Filed Oct. 16, 1919　　　2 Sheets-Sheet 1
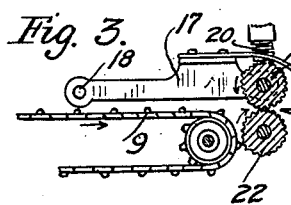
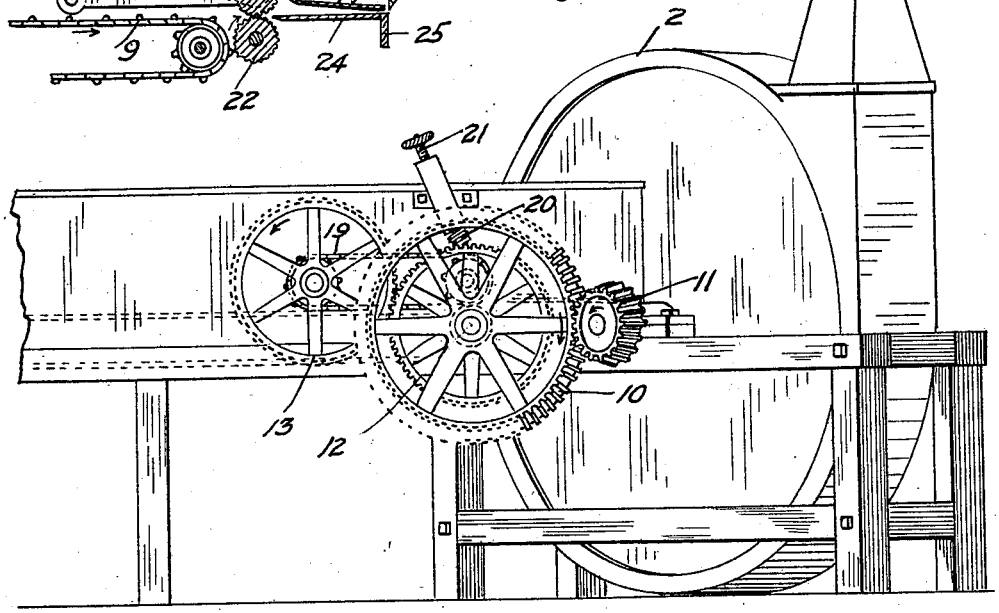
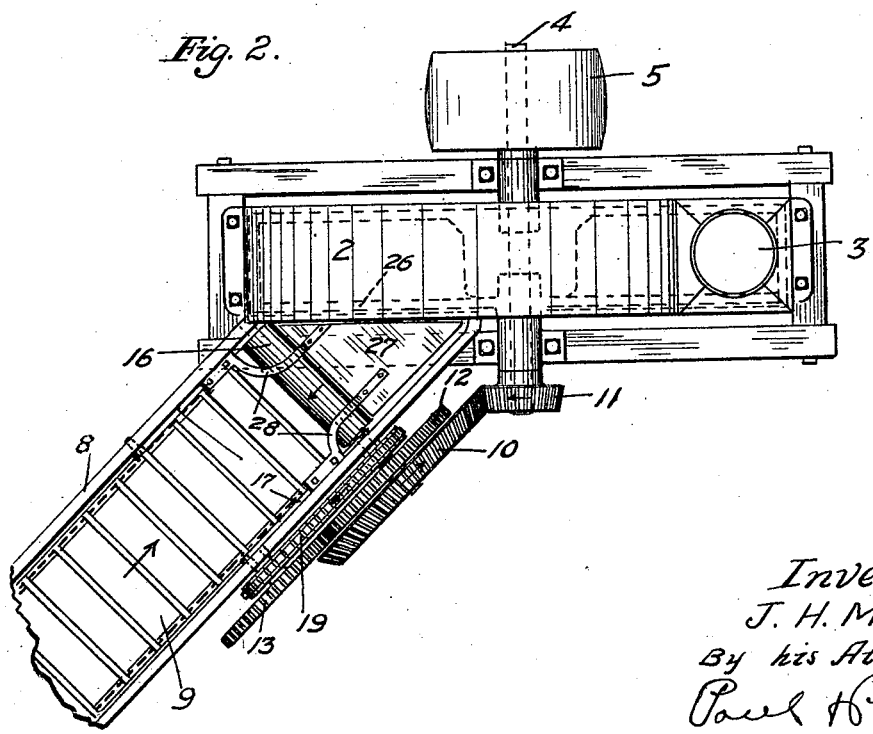
Inventor
J. H. Mott
By his Attorneys
Paul & Paul

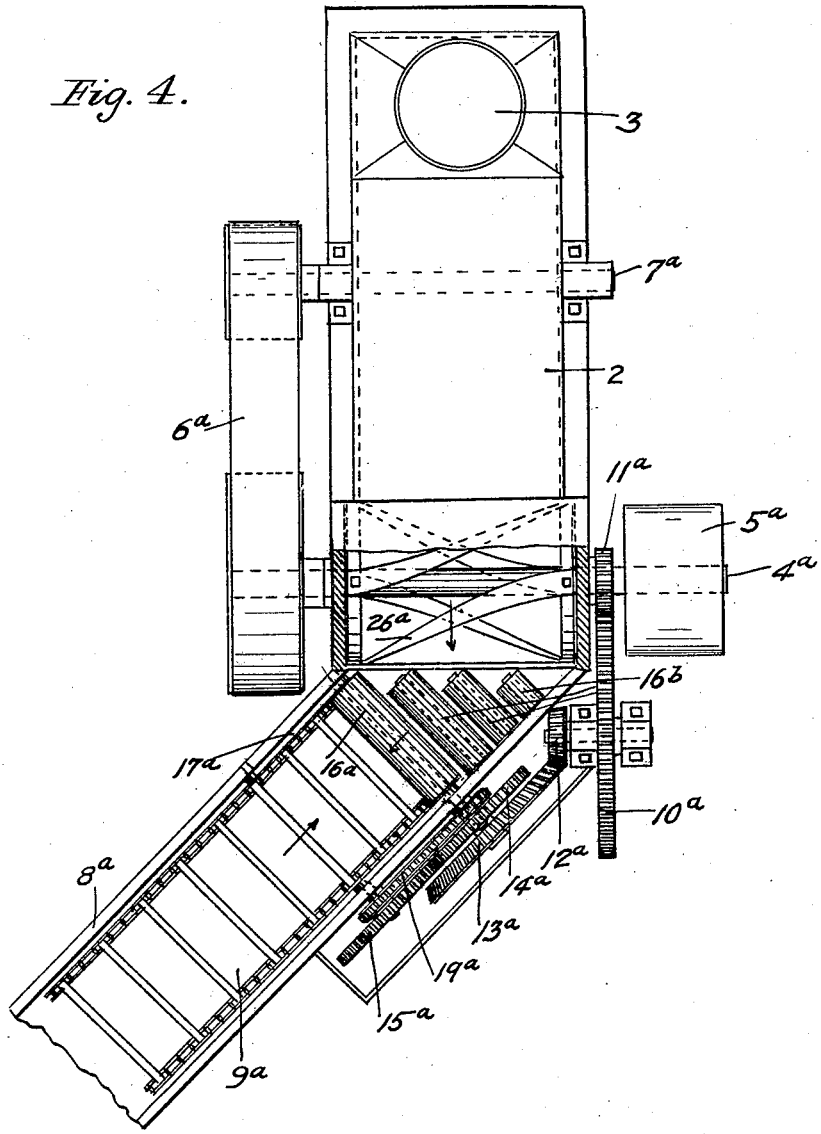

Patented Mar. 27, 1928.

1,663,720

UNITED STATES PATENT OFFICE.

JAMES H. MOTT, OF WILLMAR, MINNESOTA.

ENSILAGE CUTTER.

Application filed October 16, 1919. Serial No. 330,945.

The machines usually employed for cutting up ensilage to be packed in a silo deliver the corn at right angles or substantially so to the cutting knives. The result is the stalks are cut in cylindrical sections or pieces of varying length and frequently are of such size that they cannot be masticated easily by the cattle and there is always danger that one of these imperfectly masticated sections will lodge in the throat of the animal with fatal results.

The object, therefore, of my invention is to provide an ensilage feed which will deliver the material at such an angle to the cutting knives that the sections, instead of being cut squarely across the stalk, will be sliced obliquely in long, thin pieces, which will become softened more readily when packed in the silo and can be more easily masticated and without danger of choking the animal.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of an ensilage cutter embodying my invention,

Figure 2 is a plan view of the same,

Figure 3 is a detail view of the feed rolls, between which the ensilage material is fed to the cutting knives, Figure 4 is a plan view, partially in section, showing the invention applied to a different type of ensilage cutter.

In the drawing, 2 represents the casing of the cutter, having the usual discharge spout 3 through which the material is blown by the fan into the silo. 4 is the drive shaft, having a pulley 5. 8 is an apron frame supporting an apron 9 by means of which the ensilage is brought up to the cutting knives. A bevel pinion 11 is mounted on the shaft 4 meshing with a large bevel gear 10 on a short shaft 11ª which is provided with a gear 12 meshing with a similar gear 13. An upper feed roll 16 is mounted in a frame 17 pivoted at 18 on the apron frame and driven through a belt or chain 19 from the hub of the gear 13. The shaft of the upper feed roll projects through slots in the side boards of the apron and is free to move vertically therein as usual in devices of this kind. Springs 20, adjustable by means of screws 21, normally hold the feed roll 16 in yielding relation with respect to a lower feed roll 22. The lower feed roll is on substantially the same level as the upper run of the apron, as indicated in Figure 3, so that the ensilage brought along by the apron will be directed between the upper and lower rolls, the weight of the frame and the upper roll, assisted by the compression springs, operating to grip the ensilage and feed it forward to the knives.

The apron frame, as indicated plainly in Figure 2, is mounted obliquely with respect to the knife casing 2 so that the stalks of corn are delivered upon the feed table 24 and advanced to the stationary and revolving knives 25 and 26 obliquely with respect to the longitudinal axis of the cylinder, so that the knives, instead of cutting directly across the corn and chopping it up in small blocks or cylindrical sections, will slice it in thin pieces of any desired thickness and of such length that the ensilage will readily become softened in the silo and can be easily masticated by the animal without any danger whatever of choking. Furthermore, these thin pieces, instead of becoming hard and dry, as often occurs with the short, squarely cut blocks, will be thoroughly softened and will be far more nutritious to the stock than the small, imperfectly softened blocks.

I prefer also to provide a plate 27 above the feed table 24, supported by arms 28 mounted on the frame 17 and vertically movable therewith and with the upper feed roll, said plate normally tending to hold the ensilage flat on the feed table and prevent it from becoming bunched in passing to the revolving knives. By the adjustment of the screws 21 the pressure of the spring on the upper feed roll can be regulated according to the volume or the depth of the feed desired. Generally the material will pass in a thin sheet from the apron through the rolls to the knives and the depth of this sheet can be determined and controlled by the adjustment of the screws.

In Figure 4 I have shown a modified construction which consists in mounting the apron frame 8ª for the apron 9ª at one end of the knife casing instead of at the side. A shaft 4ª having a pulley 5ª is provided and a belt 6ª drives the fan shaft 7ª from the shaft 4ª. The gear wheel 10ª meshes with the pinion 11ᵃ on the shaft 4ᵃ and a beveled pinion 12ᵃ meshes with a beveled gear 13ᵃ and gears 14ᵃ and 15ᵃ drive the upper feed roll 16ᵃ through the belt 19ᵃ. A frame 17ᵃ supports the feed roll 16ᵃ. Idle feed rolls 16ᵇ are mounted on one side of the apron frame 8ᵃ and have the function of directing the ensilage into the path of the revolving cylinder 26ᵃ. The stalks of corn will be fed obliquely by the apron and feed rolls to the knives and cut in small, thin pieces or strips in substantially the same manner as described with reference to Figures 1 and 2, the principal difference being in placing the feed apron at one end of the casing instead of at the side to adapt it for the different type of cutter shown.

I have also found that where the stalks of corn are fed obliquely to the cutting knives that the cutting operation is performed with much less power than usual where the stalks are fed at right angles to the knives and it is not necessary to have the knives sharp where the cut is made on the bias or obliquely of the stalk. This feature of the invention adds quite materially to its value in a machine of this kind.

I make no claim in this application to the cutter itself, as one of any suitable type may be employed, the essential feature of the invention being the arrangement of the feed apron and rolls to deliver the material obliquely to the cutting knives.

I claim as my invention:

1. A device of the class described comprising a blower casing, a cutter arranged within an opening of the casing, a feed table leading to said opening and cutter, a pair of feed rolls, upper and lower, for delivering upon said table, a pair of pivoted links, rotatably journaling the upper feed roll, a compression plate yieldably supported above the table and attached by resilient flexible members with said links, and adapted to form with the table a feed-throat, and means for delivering stock between the rolls at that side opposite the table.

2. A blower casing having an opening, a cutter arranged at the opening, a table for delivering stock toward the cutter for delivery through the opening, a pair of feed rolls, upper and lower, arranged to deliver stock upon the table, a pair of pivoted links rotatably journaling the axle of the upper roll, and extending in a direction away from said table, a horizontal presser plate arranged to cooperate with the table between the rolls and cutter, said plate having resilient connection with the supporting links of the upper roll, and spaced from the table to form a throat, and a conveyor for delivering stock to the rolls at a point rearwardly of the table.

3. In combination, a cutter, a table for delivering stock toward the cutter, a pair of feed rolls upper and lower arranged to deliver stock upon the table, a pair of pivoted links rotatably journaling the upper roll, a horizontal presser plate arranged to cooperate with the table between the rolls and cutter, said plate having a supporting connection with the supporting links of the upper roll, and separated from the table to form a throat.

4. In combination, a cutter, a table for delivering stock toward the cutter, a pair of feed rolls upper and lower arranged to deliver stock upon the table, a pair of pivoted links rotatably journaling the upper roll and extending in a direction away from the table, a horizontal presser plate arranged to cooperate with the table between the rolls and cutter, said plate having resilient connections with the supporting links of the upper roll, and separated from the table to form a throat.

In witness whereof, I have hereunto set my hand this 10th day of October 1919.

JAMES H. MOTT.